(12) United States Patent
Bates et al.

(10) Patent No.: US 6,760,048 B1
(45) Date of Patent: Jul. 6, 2004

(54) DISPLAY OF OCCLUDED DISPLAY ELEMENTS ON A COMPUTER DISPLAY

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/333,332

(22) Filed: Jun. 15, 1999

(51) Int. Cl.[7] ................................................. G09G 5/00
(52) U.S. Cl. ..................... 345/797; 345/794; 345/790; 345/781; 345/803
(58) Field of Search ................................ 345/797, 794, 345/781, 790–791, 795–800, 807, 803

(56) References Cited

U.S. PATENT DOCUMENTS

| | | | | |
|---|---|---|---|---|
| 4,789,962 A | | 12/1988 | Berry et al. ................. | 345/715 |
| 4,868,765 A | * | 9/1989 | Diefendorff ................. | 345/537 |
| 5,060,170 A | | 10/1991 | Bourgeois et al. .......... | 345/788 |
| 5,377,314 A | | 12/1994 | Bates et al. ................. | 345/634 |
| 5,428,733 A | | 6/1995 | Carr ........................... | 345/809 |
| 5,487,143 A | * | 1/1996 | Southgate ................... | 345/790 |
| 5,602,563 A | | 2/1997 | Chang et al. | |
| 5,621,904 A | | 4/1997 | Elliott et al. ................ | 345/798 |
| 5,651,107 A | * | 7/1997 | Frank et al. ................ | 345/589 |
| 5,841,420 A | * | 11/1998 | Kaply et al. ................ | 345/421 |
| 5,883,626 A | | 3/1999 | Glaser et al. ............... | 345/788 |
| 6,002,397 A | * | 12/1999 | Jaaskelainen, Jr. .......... | 345/797 |
| 6,185,589 B1 | * | 2/2001 | Votipka ...................... | 345/760 |

* cited by examiner

*Primary Examiner*—Sy D. Luu
(74) *Attorney, Agent, or Firm*—Wood, Herron & Evans, LLP

(57) ABSTRACT

An apparatus, program product, and method define a portion of the window content information for a window as a prioritized display element that is displayed in a non-occluded region of a computer display in response to a determination that at least a portion of such a display element is occluded by another display element on the computer display. Also, an apparatus, program product and method manipulate multiple windows displayed on a computer display by moving a window in response to user input to move another window when it is determined that the movement of the other window would occlude at least a portion of the window. In addition, an apparatus, program product and method facilitate the selection of a subset from a set of information displayed on a computer by displaying a display representation of a set of information on a computer display, with a portion of the display representation occluded such that the display representation is partitioned into occluded and non-occluded regions. Then, in response to user input, a subset from the set of information that is represented by one of the occluded and non-occluded regions of the display representation is selected.

40 Claims, 10 Drawing Sheets

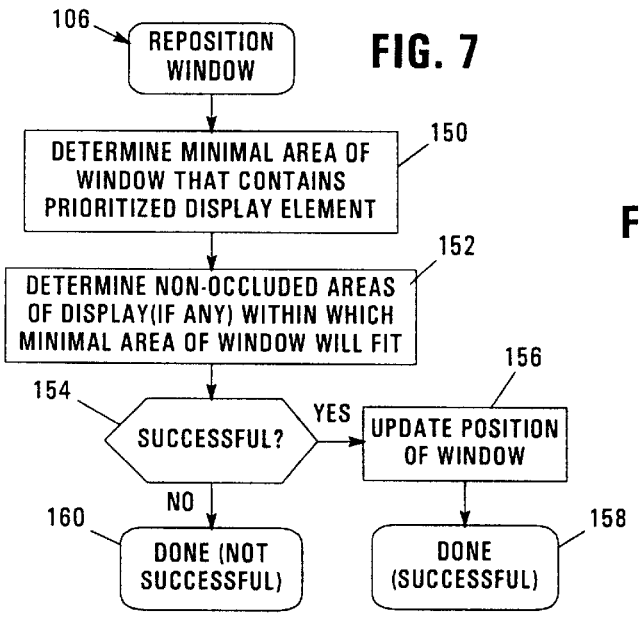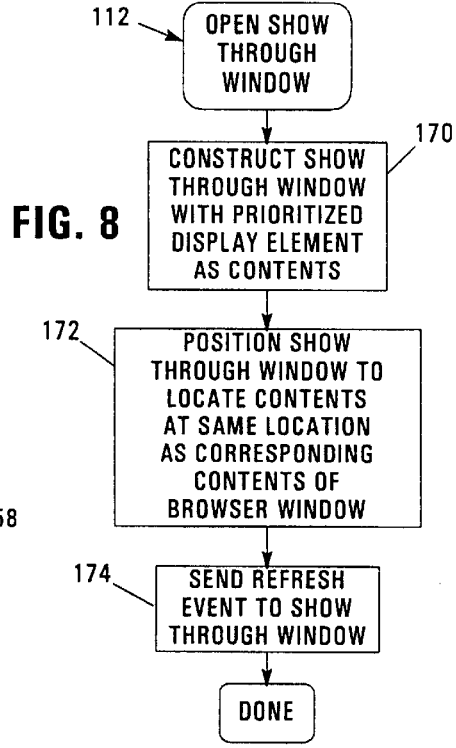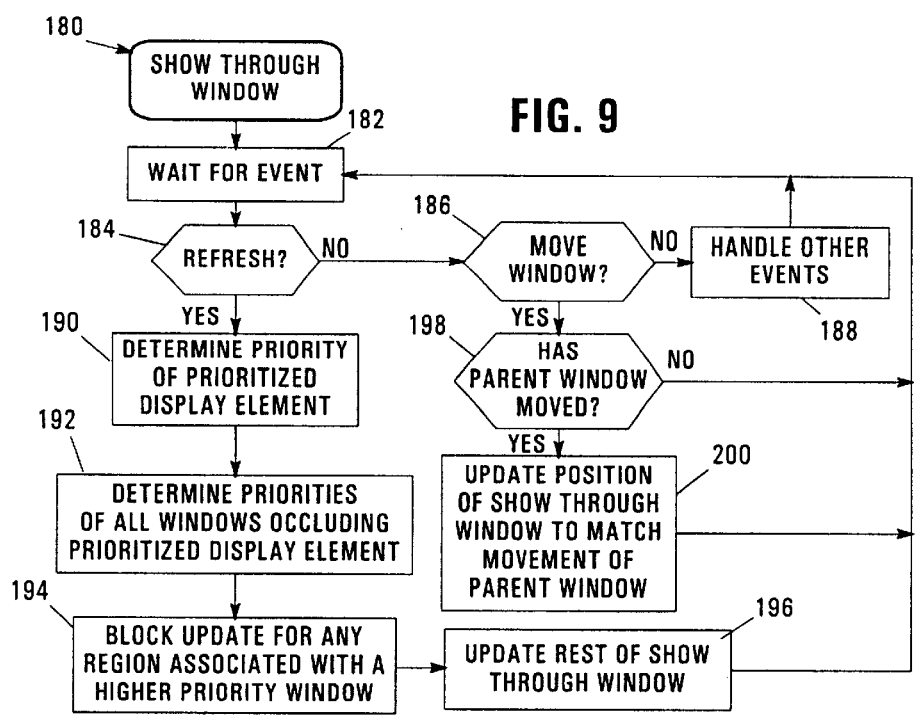

DISPLAY OF OCCLUDED DISPLAY ELEMENTS ON A COMPUTER DISPLAY

FIELD OF THE INVENTION

The invention is generally related to computers and computer software. More specifically, the invention is generally related to the display of information on a computer display.

BACKGROUND OF THE INVENTION

Many computers utilize graphical user interfaces (GUI's) to permit user interaction with information stored in such computers. In a GUI environment, users are typically able to interact with a computer through intuitive operations such as "pointing and clicking" on various graphical display elements displayed on a computer display with a graphical pointer controlled by a mouse or other user interface device.

One common type of display element used in GUI environments is a window display element, or window. A window typically includes a rectangular frame with a display region defined within the frame to display content information associated with the window. Additional user interface controls, such as scroll bars, resizing controls, title bars, menu bars, toolbars, etc., may also be provided around the periphery of the display region of a window to permit a user to interact with the window.

A computer application executing on a computer may use one or more windows. Moreover, multiple computer applications, each using separate windows, may also operate at the same time in a computer. As a result, in many instances multiple windows may be displayed at the same time on a computer display.

Given the limited amount of space on a computer display, windows are typically arranged in layers, giving the visual impression that a window displayed in a relatively higher layer overlaps a window displayed in a relatively lower layer. Interaction with a window by a user typically brings that window to the top layer, resulting in other windows being demoted to lower layers and possibly occluded at least in part by other windows or display elements.

In some instances, however, it may be desirable to permit a user to view information displayed within a window that is not currently displayed in the top layer of a computer display. For example, a user may wish to copy information between two windows, or simply be able to view the information in one window while interacting with another window. Furthermore, the author or creator of a window may wish to present interesting or important information (e.g., advertisements or instructions) to a user that is displayed regardless of whether the user is currently interacting with the window.

One manner of ensuring that a user can view information in one window while interacting with another window is to manually resize and/or move either or both windows so that the windows are displayed alongside one another in a non-overlapping fashion. Manual manipulation of window size and position, however, is often cumbersome and time consuming, and thus detrimental to productivity. Moreover, in many instances one or both of the windows may need to be resized to such a small space that the window becomes relatively useless.

Another manner of ensuring that a user can view information in a window is to declare the window as "always on top", such that the window is always displayed in the top layer regardless of whether the window is currently selected for receiving user input. Often, however, setting a window to be on top is an operation that must be specifically programmed into the computer application associated with the window. Absent specific support in the computer application, the end user is typically not capable of performing such an operation.

Moreover, even if a user is specifically permitted to set a window to always be on top, displaying the window persistently in the top layer may cause the information displayed in other windows to become occluded, thus requiring additional resizing and/or moving of windows to enable information from those other windows to be viewed in other areas of the computer display. Setting a window to always be on top may also occlude an excessive amount of area on a computer display, particularly when only a relatively small portion of the information displayed in the window is of interest to the user.

Therefore, a significant need exists in the art for an improved manner of managing windows on a computer display, in particular to simplify the display of information within multiple overlapping windows and other such display elements.

SUMMARY OF THE INVENTION

The invention addresses these and other problems associated with the prior art by providing in one aspect an apparatus, program product, and method that define a portion of the window content information for a window as a prioritized display element that is displayed in a non-occluded region of a computer display in response to a determination that at least a portion of such a display element is occluded by another display element on the computer display. By doing so, interesting information associated with a prioritized display element can often remain visible on a computer display regardless of how a user manipulates windows and other display elements on the computer display.

Also, the invention provides in another aspect an apparatus, program product and method that manipulate multiple windows displayed on a computer display. Specifically, a window is moved in response to user input to move another window when it is determined that the movement of the other window would occlude at least a portion of the window. As such, occlusion of interesting portions of a window (e.g., specific display elements displayed as window contents and/or controls for the window) may be prevented.

In addition, the invention provides in yet another aspect an apparatus, program product and method that facilitate the selection of a subset from a set of information displayed on a computer. Specifically, a display representation of a set of information is displayed on a computer display, with a portion of the display representation occluded such that the display representation is partitioned into occluded and non-occluded regions. Then, in response to user input, that portion of the information represented by either of the regions is selected. As a consequence, future user operations may be collectively performed solely on the information represented by either an occluded or non-occluded region of a computer display.

These and other advantages and features, which characterize the invention, are set forth in the claims annexed hereto and forming a further part hereof. However, for a better understanding of the invention, and of the advantages and objectives attained through its use, reference should be

BRIEF DESCRIPTION OF THE DRAWINGS

FIG. 7 is a flowchart illustrating the program flow of the reposition window routine referenced in FIG. 5.

FIG. 8 is a flowchart illustrating the program flow of the open show through window routine referenced in FIG. 5.

FIG. 9 is a flowchart illustrating the program flow of a main routine for a show through window created by the open show through window routine of FIG. 8.

DETAILED DESCRIPTION

Figure 1:
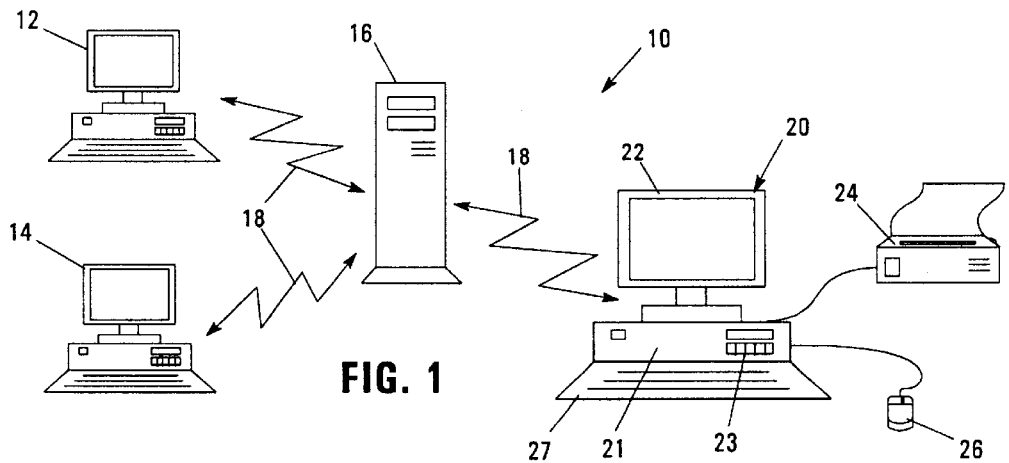
FIG. 1 is a block diagram of a networked computer system consistent with the invention.

The embodiments described herein generally operate by adjusting the display of an occluded prioritized display element such that the display element is displayed in a non-occluded region of a computer display. A display element can generally represent any graphical and/or textual information displayed on a computer display. A display element can correspond to one or more specific information objects, representing underlying content information represented by the display element, e.g., a graphical image and/or a block of text. In the alternative, a display element may correspond to a region of displayed image data, independent from any underlying content information. For example, a display element could incorporate only portions of one or more images, and/or only portions of individual text strings or characters.

One particular type of display element is a window display element, or window, which functions as a container for other display elements displayed within a display region of the window, representing the contents of the window. A window may also include various controls, e.g., scroll bars, buttons, menu bars, toolbars, resizing controls, a title bar, etc.

As will become more apparent below, a display element may be defined as a prioritized display element in a number of manners consistent with the invention. For example, a display element may be prioritized by an author of the window content information displayed within a window. As one example, a display element displayed as a component of an hypertext markup language (HTML) document may be prioritized through the use of one or more unique HTML tags embedded in the document (e.g., by delimiting a section of HTML source code via "<PRIORITIZE>" and "</PRIORITIZE>" tags). Subsequent rending and display of the HTML document in an Internet browser or other HTML-compatible viewer would result in the display element(s) between the unique tags being determined to be prioritized.

A display element may also be prioritized during display in response to user input. For example, a user may be permitted to select a specific graphical or textual object or outline an area of graphical or textual information to define a prioritized region of a display. A user may also be able to prioritize displayed information based upon whether the information is occluded or non-occluded on the computer display. Other manners of prioritizing a display element will become apparent from a reading of the material presented herein.

Once prioritized, a display element is displayed in a non-occluded region of a computer display responsive to a determination that another display element on the computer display would occlude the prioritized display element in its current, or original position. Displaying a prioritized display element in a non-occluded region can incorporate a number of computer operations consistent with the invention. For example, the display position of a display element within a window can be modified, e.g., by changing justification of the display element and/or other window contents, by performing line wrapping on the display element and/or other window contents, by scrolling the window horizontally and/or vertically, and/ or by adjusting a display characteristic (e.g., size, font, font size, etc.) of the display element and/or other window contents, among others.

As another example, the display position and/or configuration of the containing window can be modified, e.g., by moving and/or resizing the window. As yet another example, a prioritized display element can be shown through an occluding display element, e.g., by adjusting a relative display depth of the prioritized display element and/or the occluding display element, and/or by displaying the prioritized display element within a separate window in its original position on the computer display. Moreover, a prioritized display element can be displayed in a separate window in an alternate position on the computer display.

In many instances, but not always, the modifications performed on a prioritized display element, particularly when showing through an occluding display element or displaying the prioritized display element in a separate window, are performed without adjusting the display depth and/or other display characteristics of the window within which the prioritized display element is contained. Moreover, it will be appreciated that any combination of the above operations may be used to adjust the display of a prioritized display element consistent with the invention. Other modifications will be apparent to one of ordinary skill in the art having the benefit of the instant disclosure.

Hardware and Software Environment

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
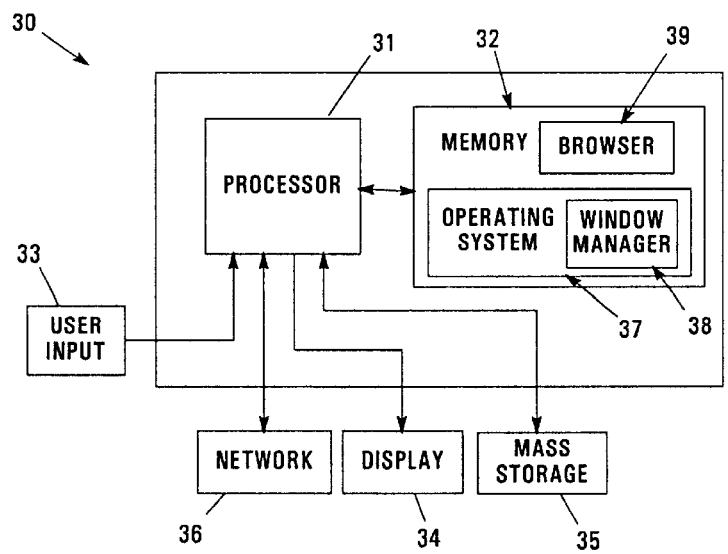
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, a handheld computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 35 or on another computer coupled to computer 30 via network 36.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others).

For additional storage, computer 30 may also include one or more mass storage devices 35, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 36 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 35 and 36 as is well known in the art.

Computer 30 operates under the control of an operating system 37, and executes or otherwise relies upon various computer software applications, components, programs, objects, modules, data structures, etc. (e.g., window manager 38 of operating system 37, and browser application 39, among others). Moreover, various applications, components, programs, objects, modules, etc. may also execute on one or more processors in another computer coupled to computer 30 via a network 36, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Display of Occluded Display Elements

The embodiment described hereinafter is implemented in a graphical user interface (GUI) environment such as the Microsoft Windows environment, among other known GUI environments. Moreover, controlling the occlusion of a prioritized display element will be discussed hereinafter in terms of an HTML-based implementation, where a prioritized display element is defined in terms of HTML source code blended and displayed in a Web browser or other suitable HTML-based viewer. However, it will be appreciated by one of ordinary skill in the art having benefit of the instant disclosure that the invention is not limited to this particular implementation, and as such, a prioritized display element may represent other forms of window content information consistent with the invention.

Figure 3:
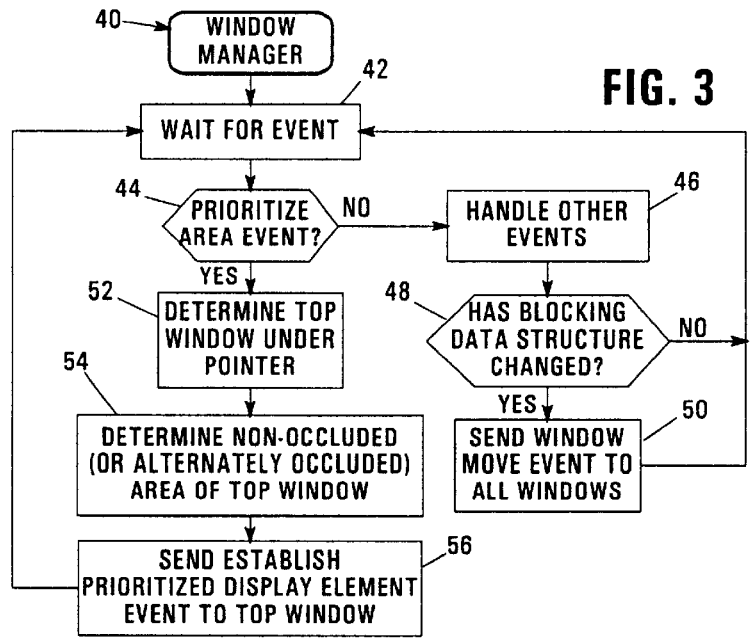
FIG. 3 is a flowchart illustrating the program flow of the window manager of FIG. 2.

FIG. 3 illustrates a main routine 40 for the window manager 38 in operating system 37 (FIG. 2). As is well known in the art, a window manager is a component used to manage the various window display elements displayed on a computer display. As shown in routine 40, the window manager is implemented as an event-driven system, whereby the manager waits for events at block 42, and upon receipt of an event, decodes the event and handles it using suitable event handling routines. It will be appreciated, however, that other programming models, e.g., procedural-based or object-oriented models (among others), may be utilized to implement routine 40, or any other routine described herein.

One event handled by routine 40 is a prioritize area event, which is detected at block 44. Other events, e.g., movement or resizing of windows, creation of new windows, closing of old windows, etc., are handled in block 46 in a manner known in the art. Then, as shown in block 48, it is determined whether a blocking data structure, maintained by the window manager, has changed as a result of handling of an event by the window manager.

As is well known in the art, various blocking data structures are utilized in the art to determine whether a particular region of a window is to be displayed. Specifically, any region of a window or other display element that is overlapped by another display element is considered "blocked" and is not rendered on the display. Thus, whenever a new window is created, or a window is moved or re-sized, etc., the portions of display elements that are overlapped by other display elements may change. In such an instance, control passes to block 50 to send "window move" events to each active window in the computer display. As will be discussed in greater detail below, a window move event is sent to each active window to inform each window that it may be necessary to update the display position of a prioritized display element due to a change in what is occluded on the computer display. Control then returns to block 42. In the alternative, other manners of initiating un-occlusion of a prioritized display element may be used.

Returning to block 48, if the blocking data structure has not changed, block 50 is bypassed, and control is returned directly to block 42.

In the implementation described herein, two principal manners of prioritizing a display element are utilized. One manner relies on the designation of a display element as prioritized within the source code of an HTML-compatible document (discussed below in connection with FIG. 11). Another manner of prioritizing a display element, however, is the selection of an area of a computer display for designation as a prioritized display element. Regardless of the manner used, however, the result is the activation of one or more display objects as a prioritized display element.

The designation of an area to prioritize is indicated by a prioritize area event, which is detected in block 44 and handled starting at block 52. The prioritize area event may be generated in a number of manners, e.g., by clicking on a particular region of a window with a mouse pointer (including optionally depressing one or more keys on the keyboard simultaneously), selecting an option from a context-sensitive menu, and other manners that will be apparent to one of ordinary skill in the art. In the illustrated implementation, selection of an area to prioritize is made by clicking on a window with a unique key combination, or after placing the pointer in a predetermined mode (e.g., via a menu or toolbar selection, among others), and selecting either the non-occluded or occluded areas of the window. To do so, block 52 determines a top-most window displayed under the pointer upon receipt of the prioritize area event. The top-most window is defined as that having the greatest priority, or highest layer, relative to other windows in the display. Next, block 54 determines the non-occluded area of the top window at which to define the area to prioritize. In the alternative, the user may select the occluded area of a window in the same manner. Furthermore, the selection of non-occluded or occluded areas may be configurable by a user.

Next, block 56 sends an "establish prioritized display element" event to the top-most window determined in block 52. Within the event, the boundary of the area to be prioritized is included with the event. Control then returns to block 42 to wait for additional events.

As will become more apparent below, an area to prioritize may have any number of shapes based upon the particular display elements that are occluding the window selected as a result of the event, e.g., rectangular, L-shaped, etc. Moreover, an area to prioritize may include multiple disjoint regions that are separated from one another, but which collectively are either non-occluded or occluded. Furthermore, when multiple regions exist, it may be desirable to select only that region that is nearest the current position of the pointer, rather than selecting all regions in the window. Other modifications will be apparent to one of ordinary skill in the art.

Figure 4:
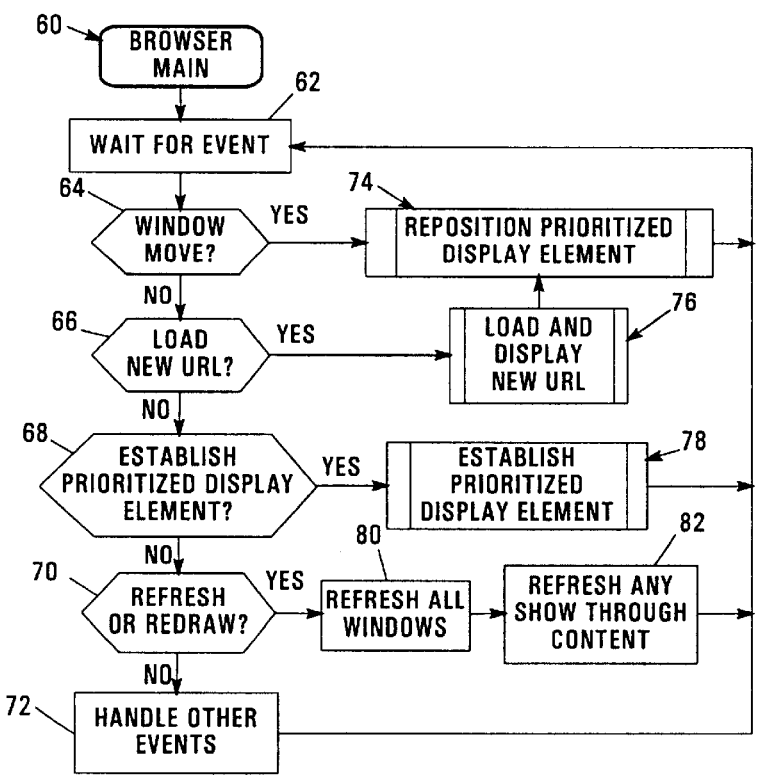
FIG. 4 is a flowchart illustrating the program flow of the browser of FIG. 2.

FIG. 4 illustrates a main routine 60 for browser 39 of FIG. 2. Browser 39 is implemented, for example, using any known Internet or Web browser or like HTML-compatible viewer. Browser 39 includes a window that is displayed on the computer display, and within which window content information is displayed within a display region of the window. The receipt of prioritize area and window move events, generated by window manager 38 (as described above in connection with FIG. 3), is specifically illustrated in FIG. 4.

Routine 60 is also implemented as an event-driven routine, waiting for events at block 62, which are detected and processed as illustrated at blocks 64–72. Block 64 detects a window move event, generated by the window manager in response to a change in the blocking data structure for the computer display. In response to such an event, a reposition prioritized display element routine 74 is called to reposition the active prioritized display element, if necessary. Control then returns to block 62 to handle additional events.

Another event handled by routine 60 is a load new URL event, which is detected at block 66 and handled by a load and display new URL routine 76. Routine 76 is utilized to retrieve a document stored at a uniform resource locator (URL) provided with the event. Upon completion of routine 76, control passes to routine 74 to reposition the active prioritized display element as necessary.

Another event handled by routine 60 is an establish prioritized display element, which is detected at block 68 and handled by an establish prioritized display element routine 78. As discussed above, such an event is generated by the window manager in response to a prioritized area event.

Yet another event handled by routine 60 is a refresh, or redraw, event, which is detected at block 70 and handled in blocks 80 and 82. Specifically, block 80 refreshes the display contents of each active window associated with the browser, in a manner well known in the art. Next, block 82 refreshes any show through content that is displayed over other active display elements in the computer display. Control then returns to block 62 to handle additional events.

Block 72 represents other events, not germane to an understanding of the invention, which are handled by a browser in a conventional manner. Upon completion of the handling of such other events, control returns to block 62 to process additional events received by the browser.

Figure 5:
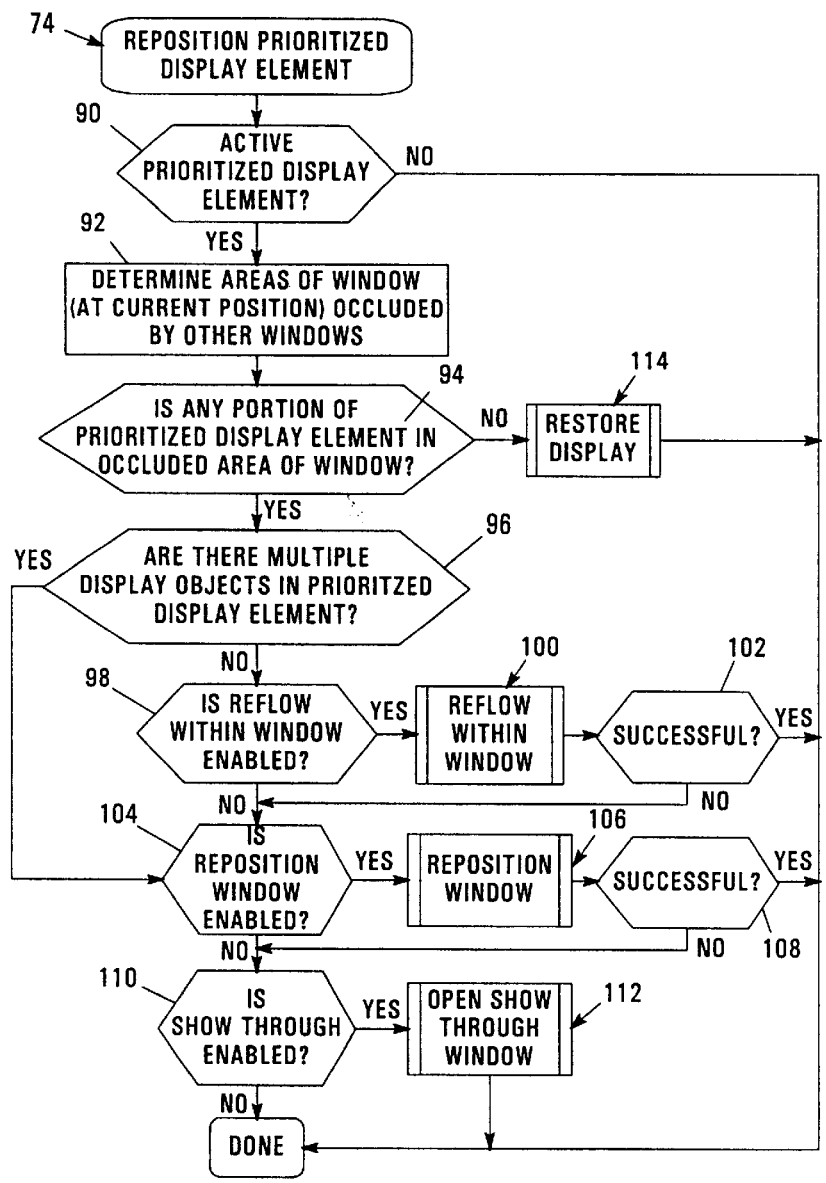
FIG. 5 is a flowchart illustrating the program flow of the reposition prioritized display element routine referenced in FIG. 4.

FIG. 5 illustrates reposition prioritized display element routine 74 in greater detail. Routine 74 begins in block 90 by determining whether an active prioritized display element exists. If not, routine 74 simply terminates.

If, however, an active prioritized display element has been established, control passes to block 92 to determine the areas of the browser window that are occluded by other windows or other display elements in the computer display. For this determination, the current position (as may have been adjusted previously as a result of occlusion of the prioritized display element) is used. In the alternative, the original position of the window (prior to any repositioning as a result of an occluded prioritized display element) may be used.

Next, block 94 determines whether any portion of the prioritized display element is located in the occluded area of the window, typically by comparing the boundary of the prioritized display element with that of the occluded area of the window. If an occlusion is detected, control passes to block 96 to determine whether multiple display objects are present in the prioritized display element. Specifically, as will be appreciated from the discussion hereinafter, a prioritized display element may be considered to include either one or multiple HTML-compatible display objects, e.g., text data, image data, hypertext links, and/or other multimedia objects.

In the illustrated implementation, three principal mechanisms are used to attempt to un-occlude a prioritized display element. The first is an attempt to reflow the display objects within the active window, such that the displayed contents of the window are modified so that the prioritized display element is moved to a non-occluded area of the display. This first mechanism, however, may be omitted when multiple display objects make up a prioritized display element, to eliminate the possibility of occluding one display object as a result of un-occluding another display object. A second mechanism for un-occluding a prioritized display element is to reposition the active window—that is, to move the window in such a manner that the prioritized display element is displayed in a non-occluded area of the display. A third mechanism is opening a show through window, which displays the prioritized display element in a separate window or frame in its original location, but on top of all (or all lower priority) occluding display elements.

In the illustrated implementation, each of the mechanisms is selectively enabled by a user, e.g., via configuration settings made available to the user. In the alternative, these settings may not be selectable by a user, with each mechanism tried in a pre-determined order in every instance that a prioritized display element is occluded. It should be appreciated that each mechanism may be used independently of other mechanisms, and further, that one or more of the mechanisms may be used cooperatively with one another in other implementations (e.g., both reflowing the window contents and moving the window). Other modifications will be apparent to one of ordinary skill in the art.

Returning to block 96, if only one display object is included in the active prioritized display element, control passes to block 98 to determine first whether reflowing within the window is enabled. If so, control passes to a reflow within window routine 100 to attempt to reflow the contents of the window. Routine 100 then returns either a "successful" or "not successful" response, which is detected at block 102. If a "successful" result is returned, routine 74 is complete. If, however, the reflow attempt was not successful, control passes to block 104 to determine whether the reposition window option is enabled.

If so, control passes to a reposition window routine 106, which attempts to reposition the active window to un-occlude any occluded prioritized display element. Based upon the result returned from routine 106, block 108 either terminates routine 74 (if successful) or passes control to block 110 (if not successful). Block 110 determines whether a show through option is enabled, and if not, terminates routine 74. If the option is enabled, however, control passes to an open show through window routine 112, prior to terminating routine 74. Returning to block 96, if multiple display objects are provided in the prioritized display element, no attempt is made to reflow within the window, and control passes to block 104 to attempt to un-occlude the prioritized display element first by attempting to reposition the active window. Also, returning to block 94, if the prioritized display element is not occluded, a restore display routine 114 is called, and routine 74 then terminates.

Figure 6:
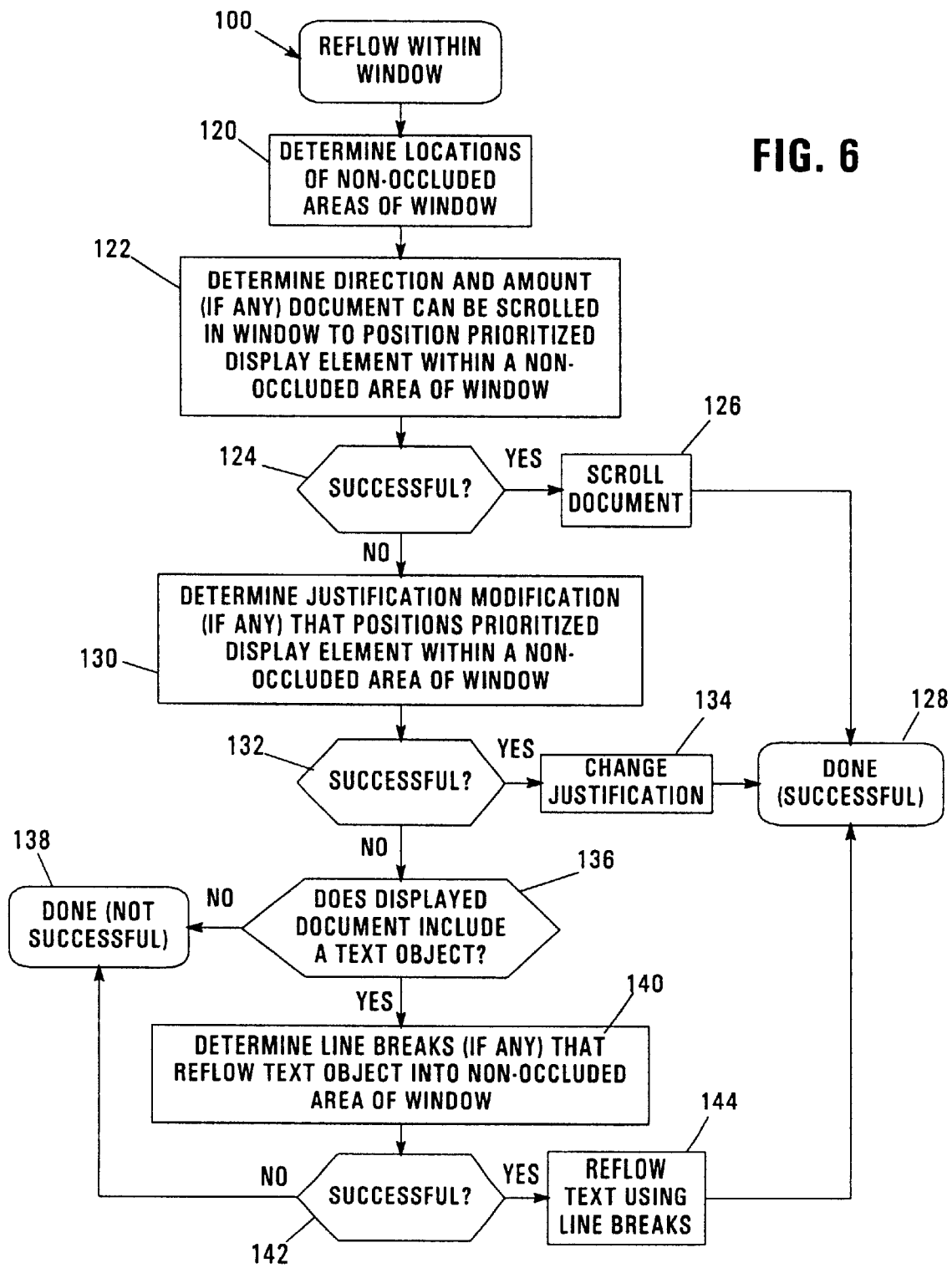
FIG. 6 is a flowchart illustrating the program flow of the reflow within window routine referenced in FIG. 5.

FIG. 6 illustrates reflow within window routine 100 in greater detail. Routine 100 begins in block 120 by determining the locations of the non-occluded areas within the active window. Next, in block 122, routine 100 attempts to determine the direction and amount that the document displayed in the window can be scrolled (either horizontally, vertically, or both) to position the prioritized display element completely within a non-occluded area of the window. Block 124 then determines whether this attempt was successful. If so, control passes to block 126 to scroll the document in the direction and amount determined in block 122, thus resulting in the prioritized display element being scrolled into a non-occluded area of the window. Control then passes to block 128 to terminate the routine with a "successful" result.

Returning to block 124, if the attempt to scroll the document was unsuccessful, control passes from block 124 to block 130 where an attempt is made to determine a justification modification that would position the prioritized display element within a non-occluded area of the window. The justification modification may represent a change in the justification of all of the contents of a window, or only a portion of the contents, including that of the prioritized display element or any surrounding display elements. As an example, if a prioritized display element is left justified and only the right half of the window is non-occluded, a simple change in justification to right justification may result in the prioritized display element being successfully repositioned to the non-occluded area of the display.

Next, block 132 determines whether the justification determination was successful. If so, control passes to block 134 to change the justification in the manner determined in block 130. Control is then passed to block 128 to return a "successful" result and terminate the routine.

Returning to block 132, if no suitable justification modification is found, control passes to block 136 to determine whether the displayed document includes a text object. If not, control passes to block 138 to return a "not successful" result and terminate the routine. If, however, a text object is included in the displayed document, control passes to block 140 to determine the line breaks, if any, that would reflow the prioritized display element into a non-occluded area of the window. The line breaks may be disposed within the prioritized display element, or may be disposed in other display elements in other areas of the displayed HTML document that have an effect on the display position of the prioritized display element.

Block 142 next determines whether any suitable line breaks were found. If not, control passes to block 138 to return a "not successful" result and terminate the routine. If successful, however, control passes to block 144 to insert the line breaks to reflow the text as determined in block 140. Control then passes to block 128 to return a "successful" result and terminate the routine.

It should be appreciated that other manners of reflowing within a window may be utilized in the alternative. For example, display characteristics, such as the size of images, font size, font type, font attributes, and other formatting options may be utilized to adjust the display characteristics of a document, and as a result, to reposition a prioritized display element within a non-occluded region of a window. It should also be appreciated that the specific manners utilized in routine 100, namely scrolling, justification, and the insertion of line breaks, may be performed in alternate sequences, and each may be used independently or cooperatively with other manners to successfully reflow window contents consistent with the invention. Moreover, a user may be permitted to configure the browser to enable only certain types of reflow mechanisms. Other modifications will be apparent to one of ordinary skill in the art.

FIG. 7 next illustrates reposition window routine 106 in greater detail. Routine 106 begins in block 150 by determining a minimal area of the window that contains the prioritized display element. Typically, the minimal area will define the approximate boundary of the prioritized display element, although in other implementations, the minimal area may be restricted to a particular area definition, e.g., a rectangle drawn about the outer perimeter of a prioritized display element.

Next, block 152 determines all non-occluded areas of the computer display within which the minimal area of the window will fit. It also may be desirable in block 152 to limit such areas to those in which the entire window will still be displayed on the computer display when repositioned to move the prioritized display element to such areas. In the alternative, however, movement of a window to a position in which a portion of the window is not displayed on the computer display may be permitted.

Block 154 next determines whether any suitable non-occluded areas were found. If so, control passes to block 156 to update the position of the window to select one of the non-occluded areas. Typically, the window will be updated to a position corresponding to the nearest-non-occluded area to minimize disruption of the display. Other criteria for selecting one of a plurality of available non-occluded areas may be utilized in the alternative. Once the position of the window is updated, control passes to block 158 to return a "successful" result and terminate the routine.

Returning to block 154, if no suitable non-occluded areas are found, block 154 passes control to block 160 to return a "not successful" result and terminate the routine.

FIG. 8 next illustrates open show through window routine 112 in greater detail. Routine 112 begins in block 170 by constructing a show through window having as its contents the prioritized display element. Construction of a show through window typically incorporates creation of a window using the supplied window management services provided by the operating system. In this implementation, it is desirable for the constructed show through window to utilize merely a frame, without additional display elements, such as a title bar, re-sizing controls, menus, toolbars, scroll bars, or the like. Moreover, it may be desirable in some instances to even omit the frame around the perimeter of the window. Typically, a show through window is rectangular in shape, bounding the prioritized display element, as well as any other display elements or portions thereof in the displayed document for the browser that are displayed adjacent to the prioritized display element within the boundaries of the show through window. In this configuration, the show through window acts much like an "aperture" in any overlapping display elements, giving the visual impression that the show through window is actually a portion of the browser window being occluded.

In the alternative, the show through window may include only the contents corresponding to the prioritized display element. Moreover, the show through window may take other shapes consistent with the invention.

Next, block 172 positions the show through window to locate its contents at the precise location of the corresponding contents in the overlapped browser window. Next, block 174 sends a refresh event to the show through window to initiate an update of that window to display the contents inserted into the window in block 170. Routine 112 is then complete.

FIG. 9 next illustrates a main routine 180 for the show through window created in routine 112 of FIG. 8. Routine 180 is also an event-driven routine, which waits for events in block 182 and processes those events using suitable event handling routines as discussed below.

One such event detected by routine 180 is a refresh event, which is generated by routine 112 of FIG. 8, and detected in block 184. Another event is a move window event, which is generated in response to a change in the blocking data structure (as discussed above), and detected in block 186. Other events, commonly handled by a conventional window, are detected and handled in block 188 in a manner known in the art.

In response to a refresh event, block 184 passes to control to block 190 to determine the priority of the prioritized display element. Next, block 192 determines the priorities of all windows that occlude the prioritized display element in the browser window. Block 194 next blocks from update any region of the show through window that is occluded by a higher priority (or higher depth) window on the computer display. Next, in block 196, the unblocked regions of the window are updated in a manner known in the art, and control then passes back to block 182.

With the configuration disclosed herein, the show through window is granted a priority that may be exceeded by other windows on the display, e.g., windows that are specified as being "always on top". However, in most instances, the show through window will be granted a relatively high priority such that occlusion of the contents of the window will rarely occur. In other implementations, the show through window may always be granted the highest priority, such that no occlusion of the prioritized display element ever occurs.

In response to a move window event, block 186 passes control to block 198 to determine whether the parent window has moved. If not, control returns to block 182. If so, control passes to block 200 to update the position of the show through window to match the movement of the parent, whereby the show through window contents track the movement of the occluding window. Control then returns to block 182.

Figure 10:
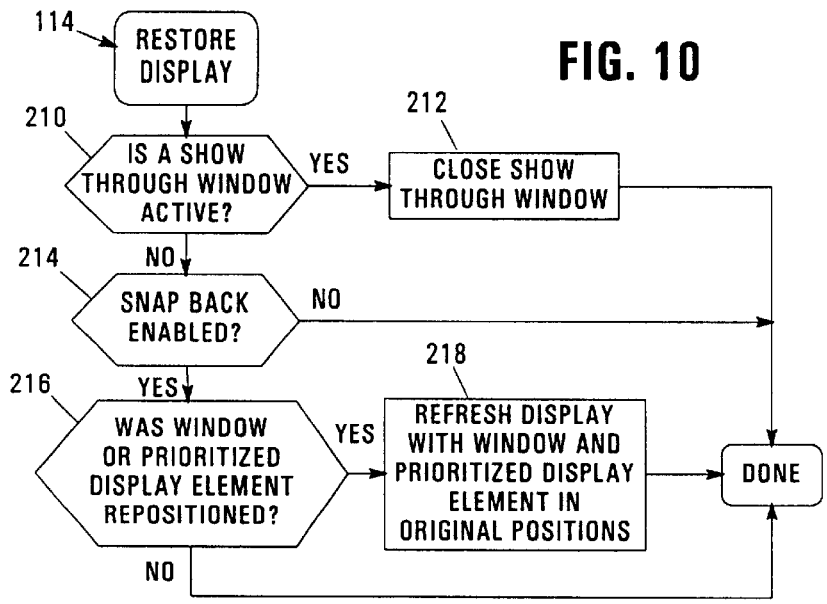
FIG. 10 is a flowchart illustrating the program flow of the restore display window routine referenced in FIG. 5.

FIG. 10 next illustrates restore display routine 114, which is called in reposition prioritized display element routine 74 of FIG. 5 when it is determined that no portion of the prioritized display element is positioned in an occluded area of the window. Routine 114 begins in block 210 by determining whether a show through window is active. If so, control passes to block 212 to close the show through window and terminate the routine. If no show through window is active, however, control is passed to block 214 to determine whether a "snap back" option is enabled, which returns the position of the prioritized display element and/or the browser window to their original positions once the prioritized display element is no longer occluded on the display. If this option is not enabled, routine 114 is simply terminated, maintaining the changes made as a result of occlusion of the prioritized display element. If, however, the option is enabled (or if "snap back" is always utilized), control passes to block 216 to determine whether the window or the prioritized display element was repositioned as a result of any occlusion. If not, routine 114 simply terminates. If, however, either the window or prioritized display element was repositioned, control passes to block 218 to refresh the display with the window and the prioritized display element disposed in the original positions. Routine 114 is then complete.

As discussed above, two manners of establishing an active prioritized display element are utilized in the herein-described implementation. A first is the designation by an author of a hypertext document of a specific display element as being a prioritized display element. Among other alternatives, such a designation could be performed for an advertisement, user instructions, or other information that the author deems to be too important to occlude. A second manner is through selecting an area of the computer display to designate as a prioritized display element. The former mechanism is implemented in load and display new URL routine 76, which is illustrated in greater detail in FIG. 11. The latter mechanism is implemented in establish prioritized display element routine 78, illustrated in greater detail in FIG. 12.

Figure 11:
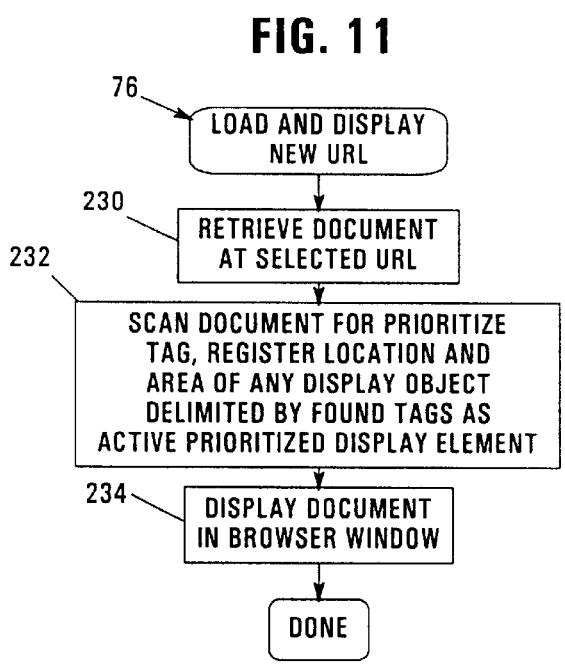
FIG. 11 is a flowchart illustrating the program flow of the load and display new URL routine referenced in FIG. 4.

FIG. 11 illustrates load and display new URL routine 76 called in routine 60 of FIG. 4 in response to a request to load a new URL (e.g., in response to clicking a hypertext link, or typing a URL into an address window, or selecting a favorite from a "favorites" list, among other mechanisms). Routine 76 begins in block 230 by retrieving the document disposed at the selected URL, or alternatively, retrieving the document from a local cache if a local copy of the document exists. Next, block 232 scans the document for a "prioritize" tag. If such a tag is found, the location and area of any display object delimited by the tag is designated as the active prioritized display element. Next, block 234 displays the document in the browser window. Moreover, at this time it may be desirable to indicate on the display the presence of the prioritized display element, e.g., through a unique color, boundary, shading, etc. Routine 230 is then complete.

Figure 12:
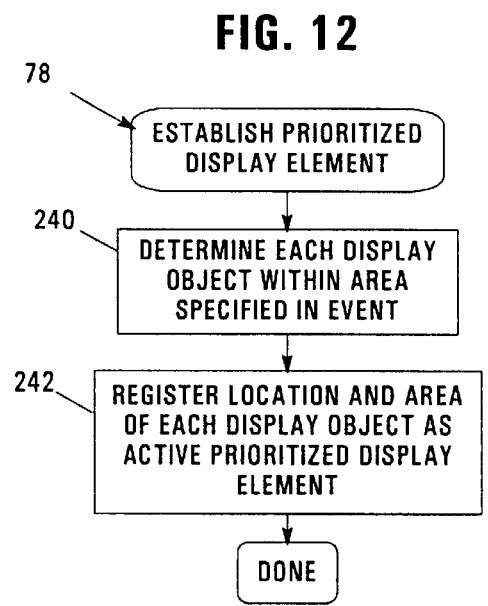
FIG. 12 is a flowchart illustrating the program flow of the establish prioritized display element routine referenced in FIG. 4.

FIG. 12 next illustrates establish prioritized display element routine 78 in greater detail. Routine 78 begins in block 240 by determining each display object within the area specified in the event passed by window manager 38. Next, block 242 registers the location and area of each display object as a portion of the active prioritized display element. Routine 78 is then complete.

A number of data structures may be utilized to define an active prioritized display element consistent with the invention. In the illustrated implementation, only one active prioritized display element is utilized at any given time. As such, whenever a specific area is selected for prioritization, or a new document is retrieved having a prioritized display element defined therein, the previous prioritized display element is discarded. Moreover, depending upon whether multiple or single HTML objects are included within a prioritized display element, different data structures may be utilized. Moreover, it may be desirable to support multiple active prioritized display elements in some implementations. Other modifications will be apparent to one of ordinary skill in the art having benefit of the instant disclosure.

Figure 13:
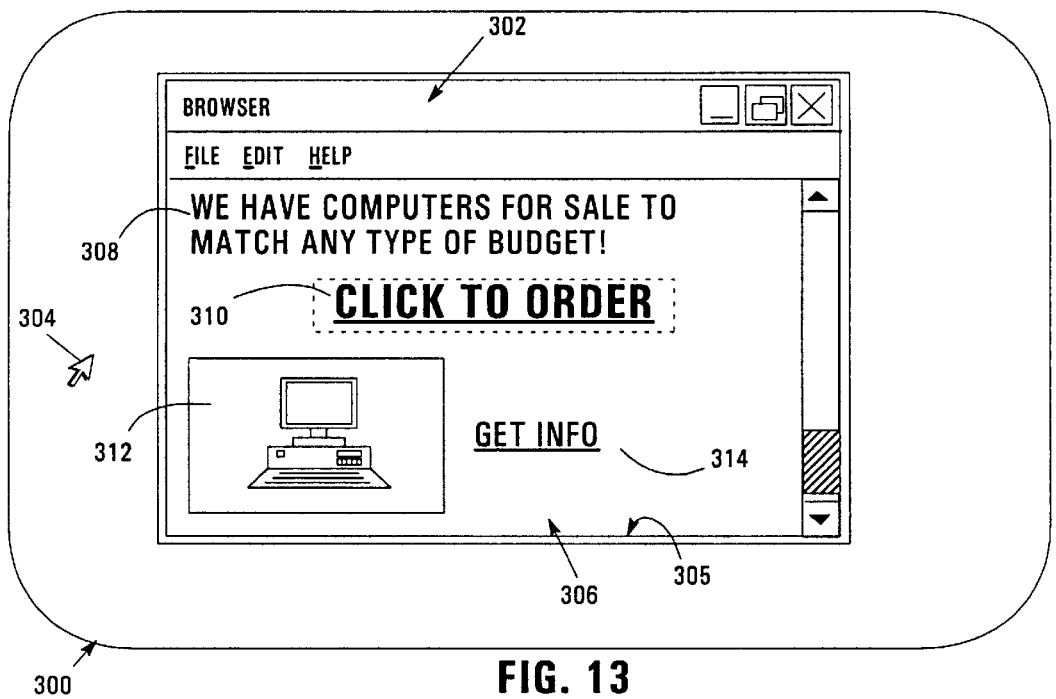
FIG. 13 is a block diagram of a computer display showing a browser window displaying an exemplary hypertext document consistent with the invention.

FIG. 13 illustrates a computer display 300 within which is displayed a browser window 302 and a pointer 304. Browser window 302 is illustrated as displaying within a display region 305 a display representation of a portion of an exemplary hypertext document 306 representing the content information for the window. One exemplary source document is shown below in Table I:

TABLE I

Example HTML Document

```
1  <html>
2  <head>
3  <title></title>
4  </head>
5  <p>WELCOME TO OUR SITE!
6  <p>WE HAVE COMPUTERS FOR SALE TO MATCH ANY TYPE
   OF BUDGET!
7  <prioritize>
8  <p><center><a href="order.html">CLICK TO ORDER</a></center>
9  </prioritize>
10 <p><img src="computer.gif">
11 <p><a href="info.html">GET INFO</a>
12 </body>
13 </html>
```

Within the display representation in window 302 is included a plurality of display objects, including a text object 308 represented by line 6 of the example document, a hypertext link object 310 represented by line 8 of the example document, an image object 312 represented by line 10 of the example document, and a hypertext link object 314 represented by line 11 of the example document. Furthermore, as represented by lines 7 and 9 of the example document, display object 310 is designated as a prioritized display element by virtue of the "<prioritize>" and "</prioritize>" tags on lines 7 and 9 of the document.

Figure 14A:
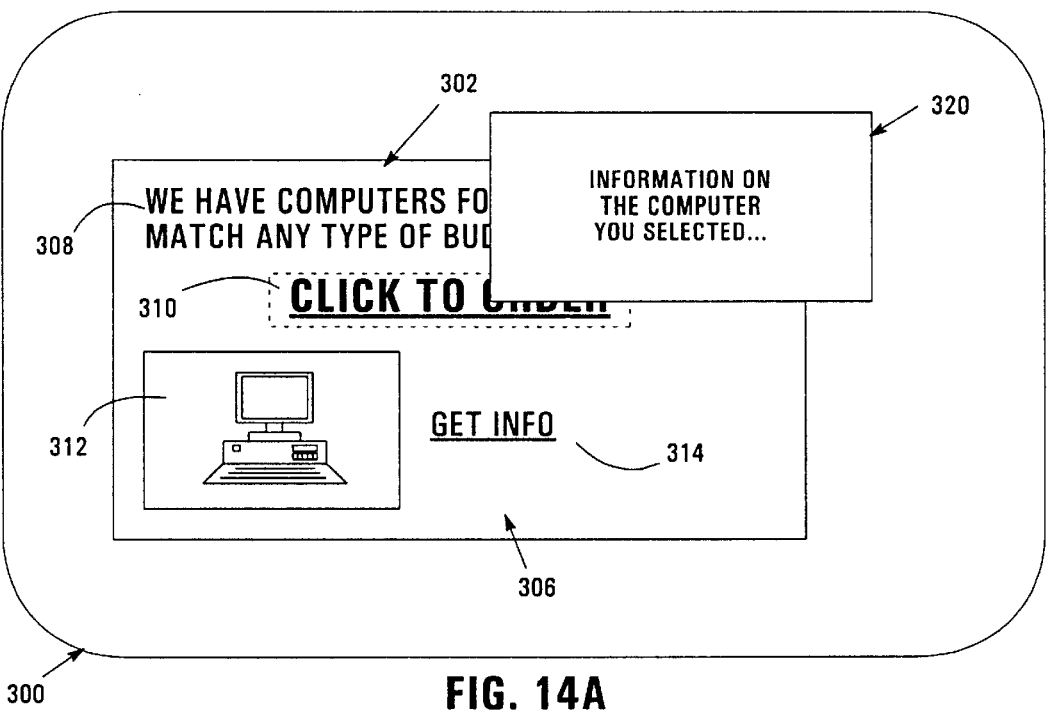
FIG. 14A is a block diagram of the computer display of FIG. 13, illustrating the occlusion of a prioritized display element by another window.

FIG. 14A next illustrates a partial occlusion of display object 310 by a window 320 that is displayed, for example, in response to selection of the "get info" hypertext link in display object 314. FIGS. 14B–14G respectively illustrate various operations that may be performed to un-occlude the prioritized display element in response to occlusion by window 320.

Figure 14B:
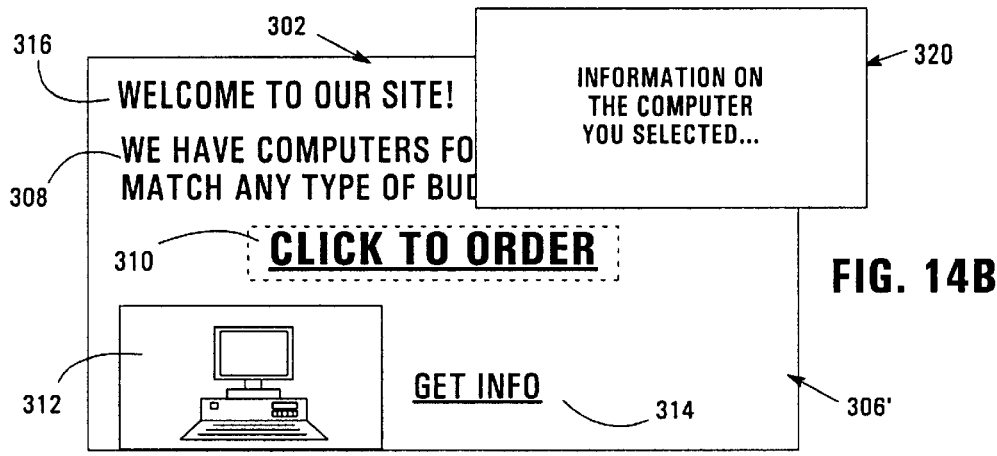
FIG. 14B illustrates the display of FIG. 14A, after un-occlusion of the prioritized display element through a scroll operation.
Figure 14C:
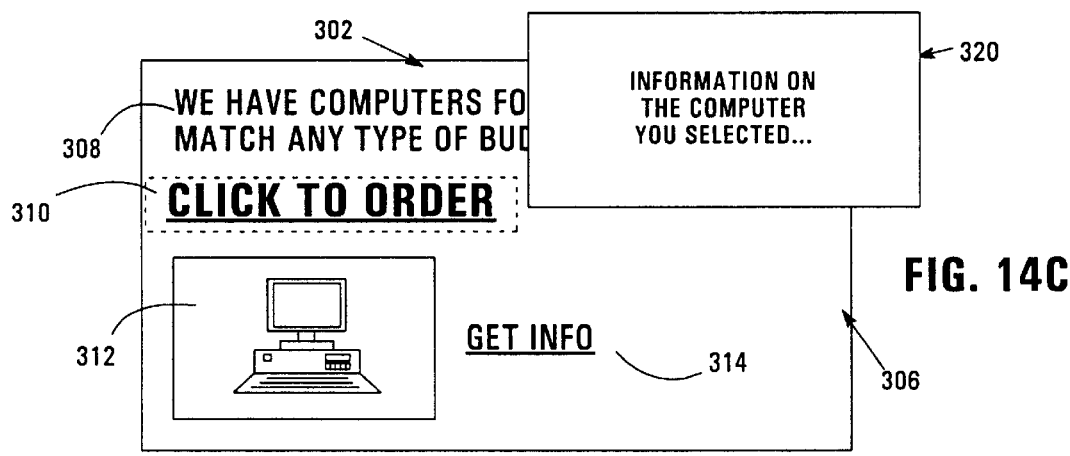
FIG. 14C is a block diagram of the computer display of FIG. 14A, after un-occlusion of the prioritized display element through a justification modification operation.

For example, FIG. 14B illustrates the results of a scroll operation, where the display representation of the hypertext document, represented at 306', has been scrolled down a selected amount such that a display object 316, corresponding to line 5 of the example document, is displayed at the top of the window, and such that display object 310 is no longer occluded by window 320. Likewise, FIG. 14C illustrates the result of a justification modification operation, whereby, rather than scrolling, the prioritized display element is un-occluded by changing the justification of display object 310 from center to left justification.

Figure 14D:
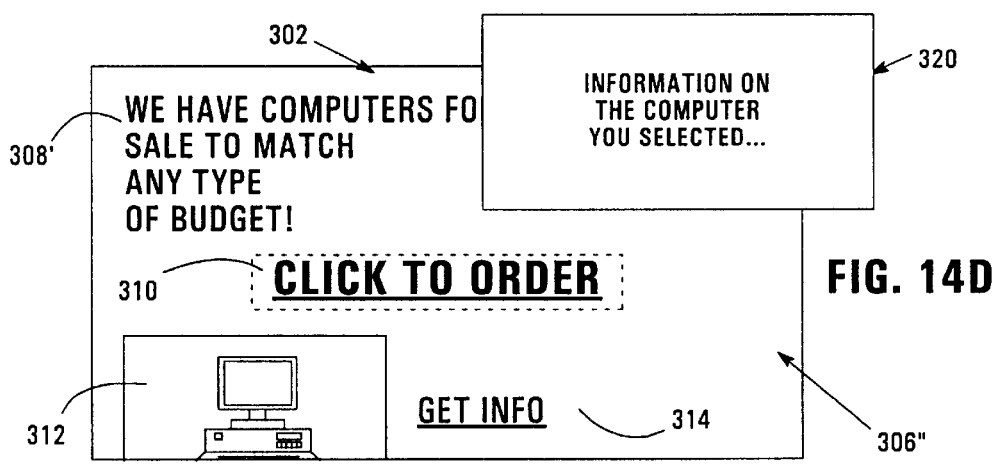
FIG. 14D is a block diagram of the computer display of FIG. 14A, after un-occlusion of the prioritized display element through a reflow operation.
Figure 14E:
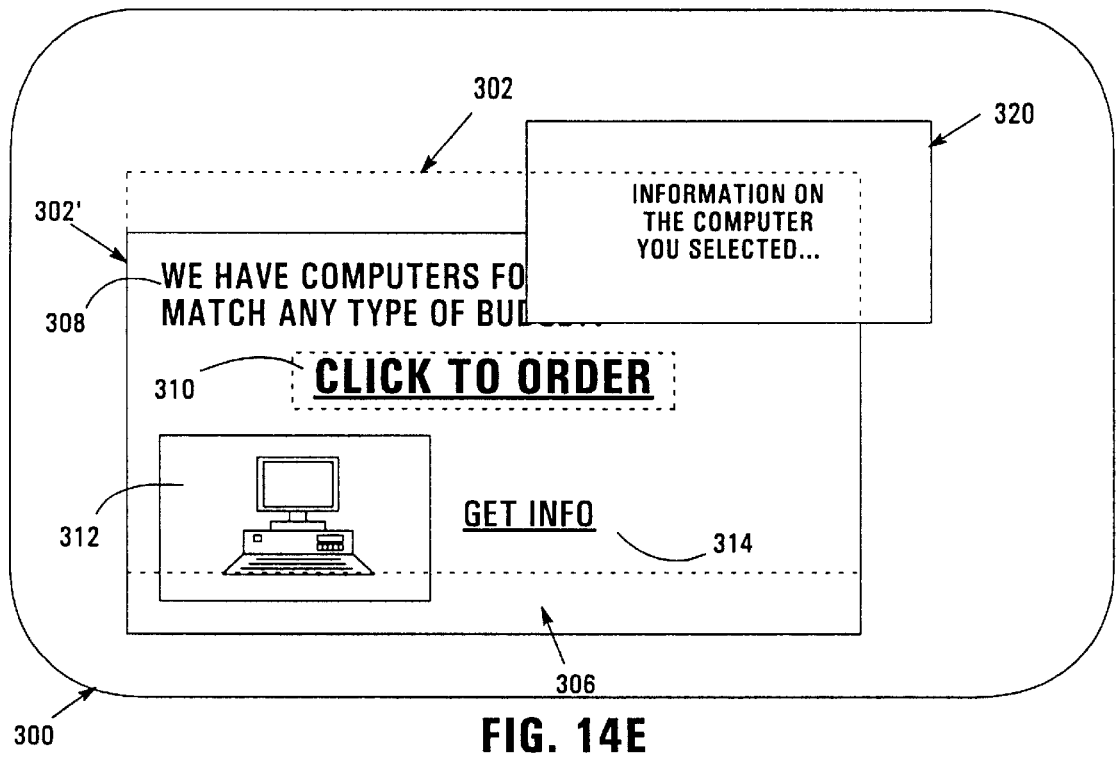
FIG. 14E is a block diagram of the computer display of FIG. 14A, after un-occlusion of the prioritized display element through a window reposition operation.
Figure 14F:
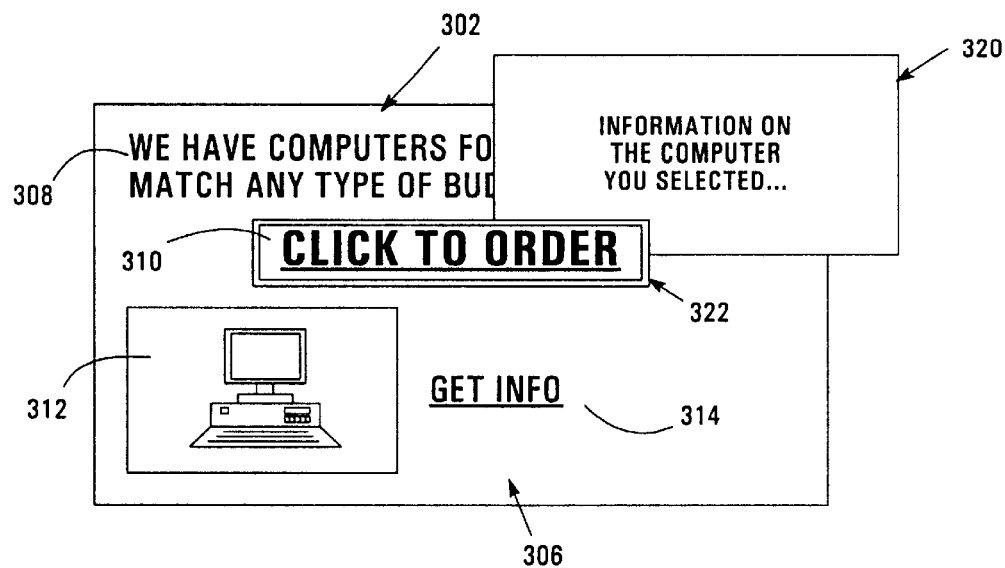
FIG. 14F is a block diagram of the computer display of FIG. 14A, after un-occlusion of the prioritized display element through the creation of a show through window.
Figure 14G:
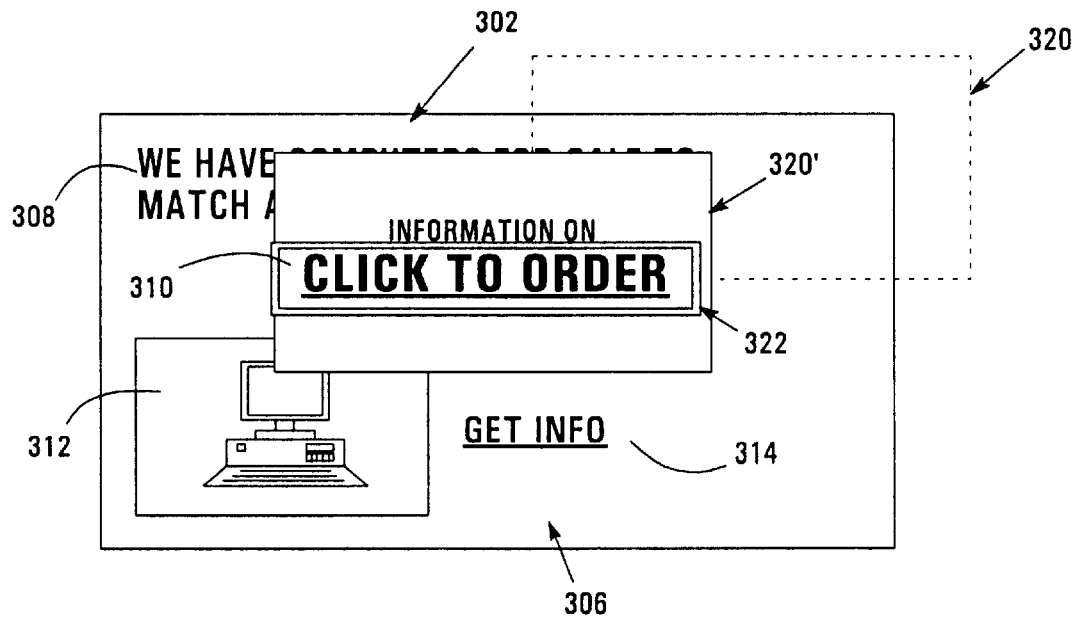
FIG. 14G is a block diagram of the computer display of FIG. 14F, after movement of the occluding window.

In addition, FIG. 14D illustrates a display representation 306" of the example hypertext document after a reflow operation, where line breaks have been inserted into display object 308 (now designated as 308') to effectively scroll the display object 310 down and outside of the overlap of window 320. FIG. 14E illustrates the result of a window reposition operation, whereby display object 310 is un-occluded by repositioning the window from the original position shown at 302 to the new position shown at 302'. FIG. 14F illustrates the result of the creation of a show through window 322 which displays prioritized display element 310 in an overlapping fashion over window 320. Furthermore, as illustrated by FIG. 14G, movement of the window 320 to the position shown at 320' does not result in occlusion of prioritized display element 310. Rather, this display element remains at the top of the display.

Figure 15:
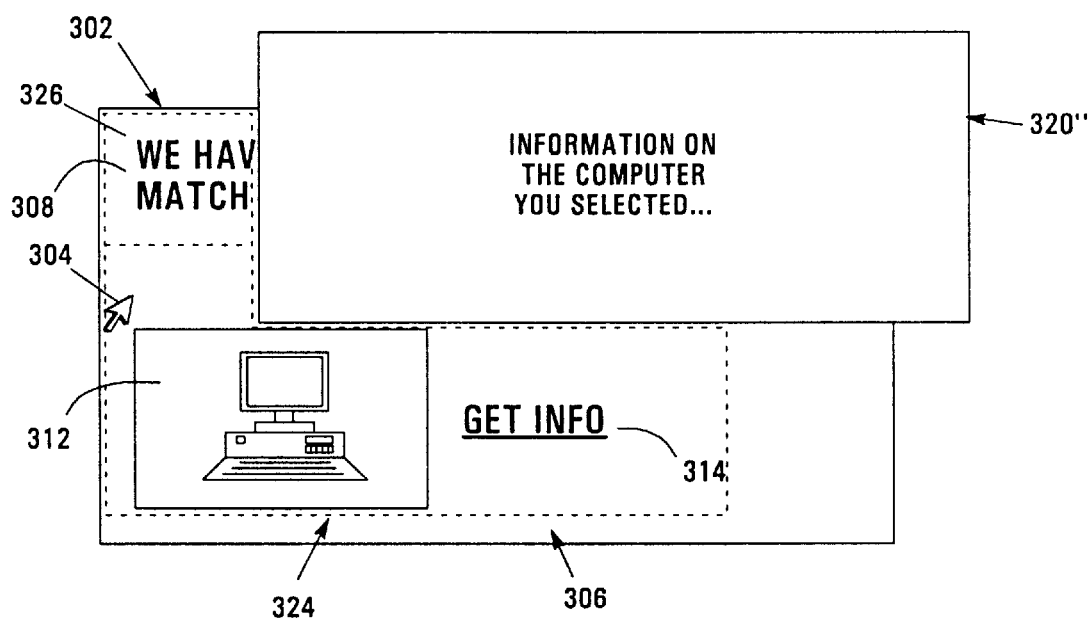
FIG. 15 is a block diagram of the computer display of FIG. 14A, illustrating establishment of a prioritized display element through a prioritize area operation.

FIG. 15 next illustrates the result of a prioritize area operation, whereby, when window 302 is overlapped by a window represented at 320", initiation of a prioritize area operation while pointer 304 is disposed in the visible region of window 302 results in creation of a prioritized display element represented at 324. As a result of the prioritize area operation, both display objects 312 and 314, which are fully visible in the non-occluded area of the window 302, are designated as part of the prioritized display element. Moreover, in some embodiments, it may also be desirable to include either all or just the displayed portion of display object 308 as part of the prioritized display element, represented by region 326. It should be appreciated that the illustrated examples for FIGS. 13–15 are provided merely for explanatory purposes, and the invention should therefore not be limited to the particular examples presented herein.

Various modifications may be made to the illustrated embodiments without departing from the spirit and scope of the invention. For example, un-occlusion of a prioritized display element can be persistently enabled, or may be selectively enabled by a user. Moreover, un-occlusion of a prioritized display element may be performed, for example, in response to movement of a pointer over the display area of a window containing a prioritized display element, with a snap back occurring when the display element is not over the window. A user-selected operation may also be performed to temporarily disable prioritization of any display element, e.g., responsive to clicking on such an element.

Other manners of un-occluding a display element may also be used, e.g., re-sizing a window, opening a new window in a non-occluded region, selecting a related object, etc. In the latter case, for example, given two display elements, selection of one display element could prioritize another display element with which it is anticipated future user interaction may be required.

Further, other manners of defining a prioritized element may also be utilized, e.g., clicking directly on a particular display object, dragging or drawing a border around a particular region or area of a display, selecting a pre-configured preference template, etc. Moreover, it should be appreciated that selection of a prioritized display element may be independent of the underlying content of a window. Specifically, the prioritized display element may actually represent the pixels within a graphical image of at least a portion of the currently-displayed window contents. In addition, for prioritized display elements defined by an area or region, it may be desirable to provide the ability to drag the boundary of a border around a prioritized display element to adjust that which is included within the element. Selecting a prioritized display element may also be used to bring just that element into the foreground without bringing the rest of the window forward, or to open a separate window for the element.

Further, multiple priorities of display elements and windows may be supported, whereby, although prioritized relative to some occluded display elements, a prioritized display element may still be occluded by other, higher priority display elements. Relative priorities of multiple prioritized display elements may also be supported.

A number of unique features are realized by virtue of the illustrated implementations. For example, through automated repositioning of a prioritized display element in response to the movement of other display elements, the prioritized display element may have the appearance of dynamically floating around the display, much like the head of a person watching a parade in a crowd. Also, through features such as line wrapping, a text-based prioritized display element may be dynamically permitted to occupy the shape of the non-occluded area of a window as other windows are moved across that window.

In addition, the illustrated implementation permits one window to be moved in response to movement of another window that occludes at least a portion of the first window. In some implementations, the occluded portion may include window content information, or in the alternative, one or more controls provided on the window, rather than defining any content as a prioritized display element as described herein. Such an implementation would permit, for example, controls on a window to always be kept in non-occluded areas of a display as other windows are moved around and over the window. This linked movement can simplify window manipulation and thus increase user productivity in many implementations.

Further, the illustrated implementation permits a subset of a set of information displayed in a window to be selected to include only that portion of the set of information is either occluded or non-occluded on the computer display. Selection of a subset based upon occlusion represents a relatively simple selection mechanism, which, in addition to the application described herein, may find utility in other applications in which window contents are selected by a user, e.g., CAD/CAM applications, image editing/publishing applications, etc. Further, once selected, any number of user operations may be performed on the selected subset, depending on the application. As but one example, in a CAD/CAM or imaging application, the non-occluded image or text data in a window may be jointly manipulated, e.g., to change the color, font, layer designation, size, etc. thereof.

Other modifications will be apparent to one of ordinary skill in the art. Therefore, the invention lies in the claims hereinafter appended.

What is claimed is:

1. A method of displaying information on a computer display, the method comprising:
   (a) displaying a window display element on a computer display, the window display element having associated therewith window content information, at least a portion of which is displayed within a display region of the window display element, and a portion of the window content information defining a prioritized display element;
   (b) determining that the portion of the window content information defines a prioritized display element through analysis of the window content information;
   (c) determining whether at least a portion of the prioritized display element is occluded by another display element displayed on the computer display; and
   (d) in response to determining that at least a portion of the prioritized display element is occluded, displaying the prioritized display element in a non-occluded region of the computer display;
   wherein the window content information and the prioritized display element are defined in a hypertext markup language (HTML) document, and wherein determining that the portion of the window content information defines a prioritized display element includes detecting a priority indicator embedded in the HTML document.

2. The method of claim 1, wherein displaying the prioritized display element includes adjusting a display position of the prioritized display element within the window display element such that the prioritized display element is located within a non-occluded area of the display region of the window display element.

3. The method of claim 1, wherein displaying the prioritized display element includes modifying a justification associated with at least a portion of the window content information.

4. The method of claim 1, wherein at least a portion of the window content information includes textual information, and wherein displaying the prioritized display element includes line wrapping the textual information to fit the prioritized display element within a non-occluded area of the display region of the window display element.

5. The method of claim 1, wherein displaying the prioritized display element includes scrolling the window display element to modify the displayed portion of the window content information in the window display element.

6. The method of claim 1, wherein displaying the prioritized display element includes adjusting a display position of the window display element on the computer display.

7. The method of claim 1, wherein displaying the prioritized display element includes displaying the prioritized display element overlapping the other display element.

8. The method of claim 7, wherein displaying the prioritized display element further includes maintaining the occlusion of the window display element by the other display element such that only the prioritized display element overlaps the other display element.

9. The method of claim 8, wherein displaying the prioritized display element further includes displaying the prioritized display element in a separate window display element overlapping the other display element.

10. The method of claim 1, wherein displaying the prioritized display element includes adjusting a display depth of the prioritized display element relative to the other display element.

11. The method of claim 1, wherein displaying the prioritized display element includes displaying the prioritized display element outside of the display region of the window display element.

12. The method of claim 1, further comprising prioritizing the portion of the window content information to define the prioritized display element in response to user input.

13. The method of claim 12, wherein prioritizing the portion of the window content information to define the prioritized display element includes defining as the prioritized display element all of the non-occluded window content information displayed in the display region of the window display element.

14. The method of claim 13, wherein prioritizing the portion of the window content information to define the prioritized display element further includes displaying a border around the prioritized display element, the method further comprising modifying the subset of window content information defining the prioritized display element in response to user input directed to the border.

15. The method of claim 12, wherein prioritizing the portion of the window content information to define the prioritized display element includes defining as the prioritized display element all of the occluded window content information displayed in the display region of the window display element.

16. The method of claim 12, wherein prioritizing the portion of the window content information to define the prioritized display element includes receiving user input designating at least a subset of window content information displayed in the display region of the window display element.

17. The method of claim 1, wherein a second portion of the window content information defines a second prioritized display element, the method further comprising:
   (a) determining whether at least a portion of the second prioritized display element is occluded by another display element displayed on the computer display; and
   (b) in response to determining that at least a portion of the second prioritized display element is occluded, displaying the second prioritized display element in a non-occluded region of the computer display.

18. The method of claim 1, wherein displaying the prioritized display element in the non-occluded region of the computer display is further responsive to the prioritized display element having a higher priority than the other display element.

19. The method of claim 1, further comprising redisplaying the prioritized display element in an original display position in response to determining that the prioritized display element is no longer occluded.

20. The method of claim 1, further comprising maintaining the prioritized display element in the non-occluded region of the computer display after the prioritized display element is no longer occluded.

21. An apparatus, comprising:
   (a) a memory;
   (b) window content information resident in the memory, a portion of which defining a prioritized display element; and
   (c) a program, resident in the memory, the program configured to display a window display element on a computer display, the window display element associated with the window content information and having a display region within which is displayed at least a portion of the window content information, the program further configured to display the prioritized display element in a non-occluded region of the computer display in response to a determination that at least a portion of the prioritized display element is occluded by another display element displayed on the computer display;

wherein the program is further configured to determine that the portion of the window content information defines a prioritized display element through analysis of the window content information, wherein the window content information and the prioritized display element are defined in a hypertext markup language (HTML) document, and wherein the program is further configured to determine that the portion of the window content information defines a prioritized display element by detecting a priority indicator embedded in the HTML document.

22. The apparatus of claim 21, wherein the program is further configured to display the prioritized display element within the non-occluded region of the computer display by adjusting a display position of the prioritized display element within the window display element such that the prioritized display element is located within a non-occluded area of the display region of the window display element.

23. The apparatus of claim 21, wherein the program is further configured to display the prioritized display element within the non-occluded region of the computer display by modifying a justification associated with the prioritized display element.

24. The apparatus of claim 21, wherein the prioritized display element includes textual information, and wherein the program is further configured to display the prioritized display element within the non-occluded region of the computer display by line wrapping the textual information to fit the textual information within a non-occluded area of the display region of the window display element.

25. The apparatus of claim 21, wherein the program is further configured to display the prioritized display element within the non-occluded region of the computer display by scrolling the window display element to modify the displayed portion of the window content information in the window display element.

26. The apparatus of claim 21, wherein the program is further configured to display the prioritized display element within the non-occluded region of the computer display by adjusting a display position of the window display element on the computer display.

27. The apparatus of claim 21, wherein the program is further configured to display the prioritized display element within the non-occluded region of the computer display by displaying the prioritized display element overlapping the other display element.

28. The apparatus of claim 27, wherein the program is further configured to maintain the occlusion of the window display element by the other display element such that only the prioritized display element overlaps the other display element.

29. The apparatus of claim 28, wherein the program is further configured to display the prioritized display element within the non-occluded region of the computer display by displaying the prioritized display element in a separate window display element overlapping the other display element.

30. The apparatus of claim 21, wherein the program is further configured to display the prioritized display element within the non-occluded region of the computer display by adjusting a display depth of the prioritized display element relative to the other display element.

31. The apparatus of claim 21, wherein the program is further configured to display the prioritized display element within the non-occluded region of the computer display by displaying the prioritized display element outside of the display region of the window display element.

32. The apparatus of claim 21, wherein the program is further configured to prioritize a portion of the window content information to define the prioritized display element in response to user input.

33. The apparatus of claim 32, wherein the program is further configured to prioritize the portion of the window content information by defining as the prioritized display element all of the non-occluded window content information displayed in the display region of the window display element.

34. The apparatus of claim 32, wherein the program is further configured to prioritize a portion of the window content information to define the prioritized display element by defining as the prioritized display element all of the occluded window content information displayed in the display region of the window display element.

35. The apparatus of claim 21, wherein the program is further configured to redisplay the prioritized display element in an original display position in response to a determination that the prioritized display element is no longer occluded.

36. A program product, comprising:
  (a) a program configured to display a window display element on a computer display, the window display element associated with window content information and having a display region within which is displayed at least a portion of the window content information, at least a portion of the window content information defining a prioritized display element, and the program further configured to display the prioritized display element in a non-occluded region of the computer display in response to a determination that at least a portion of the prioritized display element is occluded by another display element displayed on the computer display; and
  (b) a computer readable media bearing the program; wherein the program is further configured to determine that the portion of the window content information defines a prioritized display element through analysis of the window content information, wherein the window content information and the prioritized display element are defined in a hypertext markup language (HTML) document, and wherein the program is further configured to determine that the portion of the window content information defines a prioritized display element by detecting a priority indicator embedded in the HTML document.

37. The program product of claim 36, wherein the signal bearing media comprises at least one of a recordable media and a transmission-type media.

38. A method of displaying information on a computer display, the method comprising:
  (a) displaying a window display element on a computer display, the window display element having associated therewith window content information, at least a portion of which is displayed within a display region of the window display element, and a portion of the window content information defining a prioritized display element;

(b) determining whether at least a portion of the prioritized display element is occluded by another display element displayed on the computer display; and (c) in response to determining that at least a portion of the prioritized display element is occluded, displaying the prioritized display element in a non-occluded region of the computer display;

wherein prioritizing the portion of the window content information to define the prioritized display element includes defining as the prioritized display element all of the non-occluded window content information displayed in the display region of the window display element, and wherein prioritizing the portion of the window content information to define the prioritized display element further includes displaying a border around the prioritized display element, the method further comprising modifying the subset of window content information defining the prioritized display element in response to user input directed to the border.

39. An apparatus, comprising:

(a) a memory;

(b) window content information resident in the memory, a portion of which defining a prioritized display element; and (c) a program, resident in the memory, the program configured to display a window display element on a computer display, the window display element associated with the window content information and having a display region within which is displayed at least a portion of the window content information, the program further configured to display the prioritized display element in a non-occluded region of the computer display in response to a determination that at least a portion of the prioritized display element is occluded by another display element displayed on the computer display;

wherein the program is configured to prioritize the portion of the window content information to define the prioritized display element by defining as the prioritized display element all of the non-occluded window content information displayed in the display region of the window display element, and wherein the program is configured to prioritize the portion of the window content information to define the prioritized display element further by displaying a border around the prioritized display element, the program further configured to modify the subset of window content information defining the prioritized display element in response to user input directed to the border.

40. A program product, comprising:

(a) a program configured to display a window display element on a computer display, the window display element associated with window content information and having a display region within which is displayed at least a portion of the window content information, at least a portion of the window content information defining a prioritized display element, and the program further configured to display the prioritized display element in a non-occluded region of the computer display in response to a determination that at least a portion of the prioritized display element is occluded by another display element displayed on the computer display; and (b) a computer readable media bearing the program; wherein the program is configured to prioritize the portion of the window content information to define the prioritized display element by defining as the prioritized display element all of the non-occluded window content information displayed in the display region of the window display element, and wherein the program is configured to prioritize the portion of the window content information to define the prioritized display element further by displaying a border around the prioritized display element, the program further configured to modify the subset of window content information defining the prioritized display element in response to user input directed to the border.

* * * * *